March 15, 1932.  H. HAYES  1,849,188

METHOD OF MAKING SLOTTED PIPE

Filed Aug. 24, 1929

HARRY HAYES
INVENTOR

Paul W. Pritzman
ATTORNEY

Patented Mar. 15, 1932

1,849,188

UNITED STATES PATENT OFFICE

HARRY HAYES, OF LOS ANGELES, CALIFORNIA, ASSIGNOR TO GENERAL PETROLEUM CORPORATION OF CALIFORNIA, A CORPORATION OF DELAWARE

METHOD OF MAKING SLOTTED PIPE

Application filed August 24, 1929. Serial No. 388,188.

My invention pertains to the art of manufacturing slotted pipe and specifically to the product known as screen pipe, used for keeping sand out of oil wells.

The object of my invention is to produce screen pipe having any number of slots, of any desired width and having any angle of slot wall, in a more expeditious and cheaper manner than has heretofore been possible.

The slotting of pipe or casing to fit it for use in straining sand out of the oil which flows into a producing well is well known and understood. It is also well known that in many, if not most, cases it is desirable to form the slot with the walls on an inwardly expanding angle rather than parallel. As the oil flows from the outside to the inside of the casing, a slot having greater width inside than outside will choke much less readily and consequently may be kept in operation for a longer time without cleaning the slots.

Heretofore the very narrow slots used for this purpose, which may for instance be $\frac{1}{10}$ inch in width and say 2 inches long, have been formed in the finished pipe. Where the slots have parallel walls no particular difficulty is experienced in forming them at this stage, as they may be milled from the outside, but where slots of a greater internal width are used they have had to be milled from the inside of the pipe or formed by the action of a blow torch set at an angle or in some similar tedious and expensive manner.

I propose to form the slots in the flat plate from which the pipe is later to be rolled. This enables me to form the slots from the upper side of the sheet, this side later becoming the interior of the pipe. It also enables me to form the slots in relatively hot metal which is easily punched and, if desired, swaged to the required angle.

The objects and advantages of my invention will be more clearly evident from the attached drawings and the appended description thereof, in which, Fig. 1 represents a short section of a sheet from which the pipe is later to be formed, the dimension A—A representing the circumference of the finished pipe.

In all of the drawings, 10 indicates the sheet from which the pipe blank is formed; 11 indicates the upper surface upon which the tools of the roll or rolls operate and which later becomes the inside of the pipe, and 12 indicates the lower surface which becomes the outside of the pipe.

Figure 1:
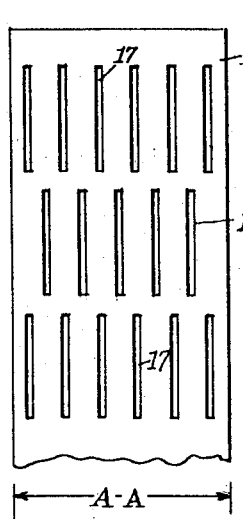
Figure 2:
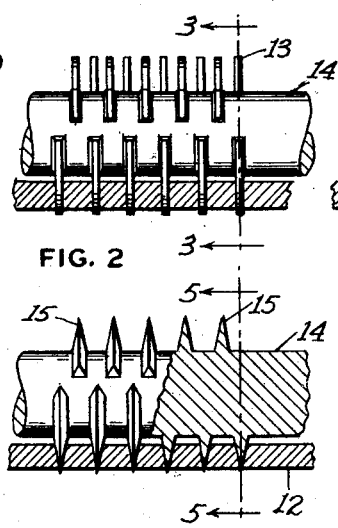
Fig. 2 represents diagrammatically a method of forming the slots by means of rolling, the figure showing a front elevation of a roll upon which tools are mounted as teeth, rolling slots into a plate or sheet beneath it. The teeth are adapted to make slots having parallel walls.
Figure 3:
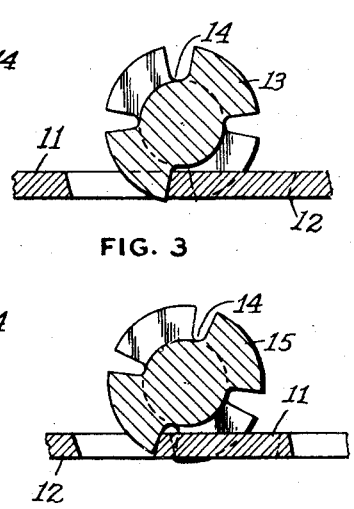
Fig. 3 is a side elevation, in section, of the subject matter of Fig. 2, taken along the line 3—3 of Fig. 2.
Figure 4:
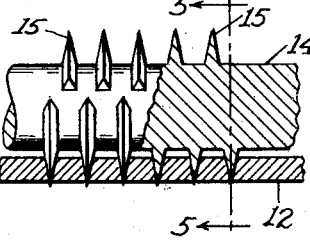
Fig. 4 is a front elevation corresponding to Fig. 2, with this difference that the teeth upon the roll have sharp edges, hence are adapted to make wedge-shaped slots.
Figure 5:
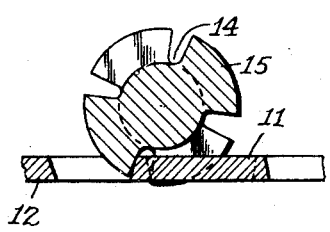
Fig. 5 is a side elevation, in section, corresponding to Fig. 3, taken along the line 5—5 of Fig. 4.
Figure 6:
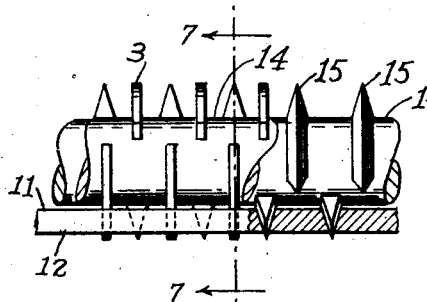
Fig. 6 is a front elevation illustrating the method of rolling the slots by means of two rolls, one behind the other, the first having sharp teeth and the second blunt ones.
Figure 7:
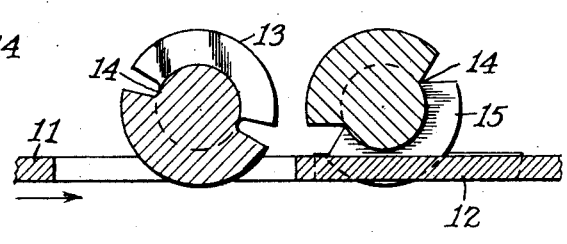
Fig. 7 is a side elevation of a section taken upon the line 7—7 of Fig. 6, and corresponds to Figs. 3 and 5.

Referring to Fig. 2, 13—13 are tools mounted as teeth upon and preferably rotated by a roll or mandrel 14 in any conventional manner. The teeth are preferably arranged so that alternate rows of them roll slots in the blank 10 in the staggered or alternating arrangement shown in Fig. 1. In Figs. 3 and 7, 15—15 indicates wedge-shaped teeth or teeth sharpened on their outer edges so that a wedge-shaped slot will be rolled.

In using my method, a flat pipe blank to be perforated is drawn under the toothed roll 14 while said roll is subjected to a pressure sufficient to cause the teeth thereon, 13 or 15, to perforate the blank. The rolling may be done while the blank is hot or cold. It is immaterial whether the roll is advanced over the sheet or the sheet drawn under the roll. Likewise, it does not matter whether the pressure is applied from above to the roll or from below upon the sheet. It is essential, however, that the teeth be of such shape and dimensions and pressed in to such an extent that the resulting rolled slots be of the dimensions giving the desired slot size when the pipe blank is formed into pipe and butt-welded, as shown in cross-section in Fig. 7, in which 16 indicates the weld.

An initial wedge-shaped slot is not necessary to give a wedge-shape to the slot in the pipe which is the final product. The reason is that when the pipe itself is formed, whether by pulling the blank through a ring die or otherwise, one edge of the slot is compressed while the one on the opposite side of the blank is pulled apart. This degree of compression and opening varies, of course, with the size of the pipe and the slot dimensions.

Figure 8:
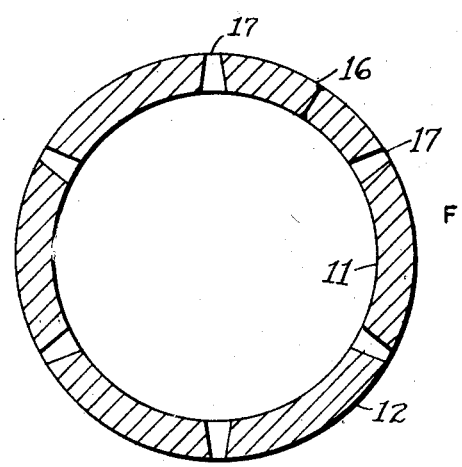
Fig. 8 represents in cross-section a pipe rolled from the flat sheet slotted in the manner shown in either of the preceding figures.

In order then to provide a method by which the slots will be subjected to minimum strain and distortion when the pipe is formed, and also to make it easier for the tools to work in heavy blanks, I have provided the method illustrated in Fig. 7. Here a wedge-toothed roll precedes a square-tooth roll, the one behind being so arranged that the teeth 13 of the latter enter into and enlarge the slots made by the teeth 15 of the wedge-toothed roll so that the amount of metal to be moved by the squared teeth is reduced. After this double operation the desired size of slot has been obtained and the blank is formed into pipe as before. Fig. 8 shows the final result in which 17—17 are the slots shown in section. In Fig. 1, the slots are shown in plain view.

In my method I do not restrict myself to any particular method of forming the pipe or of joining the edges of the blank.

It should be noted that when the sheet is rolled with the wide side of the slot inside, the rolling will reduce the internal width by an amount which will vary with the diameter of the pipe. This reduction in internal width is material and should be allowed for in forming the taper of the original slot. The reduction in width may be readily calculated when the diameter of the pipe to be formed and the thickness of the metal are known.

I claim as my invention:

1. The method of forming slotted pipe which comprises: forming in a flat sheet, while maintaining the flatness thereof, lines of successive slots, said slots being produced by rolling over said sheet under heavy pressure, one or more rollers upon which tools capable of forming the slots are mounted as teeth; thereafter rolling said sheet into tubular form and joining the adjacent edges of the sheet.

2. The method of forming slotted pipe which comprises: forming in a flat sheet, while maintaining the flatness thereof, lines of successive slots, said slots being wider at one side of the sheet than at the other, said slots being produced by rolling over said sheet under heavy pressure, one or more rollers upon which tools capable of forming the slots are mounted as teeth, thereafter rolling said sheet into tubular form with the wider edge of the slots inside, then joining the adjacent edges of the sheet.

3. The method of forming slotted pipe which comprises: forming in a flat sheet, while maintaining the flatness thereof, lines of successive slots having substantially parallel walls, then widening the slots on one side of the sheet, both operations being accomplished by rolling over the sheet under heavy pressure one or more rollers having mounted thereon as teeth tools capable of forming the respective shape of slot; thereafter rolling said sheet into tubular form with the wider edge of the slots inside, then joining the adjacent edges of the sheet.

4. The method of forming slotted pipe which comprises: punching in a flat sheet, while maintaining the flatness thereof, lines of successive slots having substantially parallel walls, then forcing apart the slot edges on one side of the sheet so as to produce a substantially truncated-pyramid shaped opening, said operations being each performed by rolling over the sheet under heavy pressure, one or more rollers having mounted thereon as teeth, tools capable of forming the respective shapes of slot; thereafter rolling said sheet into tubular form with the wider edge of the slots inside, then joining the adjacent edges of the sheet.

In witness that I claim the foregoing I have hereunto subscribed my name this 19th day of August, 1929.

HARRY HAYES.